United States Patent
Pare, Jr.

(10) Patent No.: US 7,245,677 B1
(45) Date of Patent: Jul. 17, 2007

(54) EFFICIENT METHOD FOR MULTI-PATH RESISTANT CARRIER AND TIMING FREQUENCY OFFSET DETECTION

(75) Inventor: Thomas Edward Pare, Jr., Mountain View, CA (US)

(73) Assignee: Ralink Technology, Inc., Cupertino, CA (US)

( * ) Notice: Subject to any disclaimer, the term of this patent is extended or adjusted under 35 U.S.C. 154(b) by 708 days.

(21) Appl. No.: 10/797,299

(22) Filed: Mar. 9, 2004

Related U.S. Application Data

(60) Provisional application No. 60/455,152, filed on Mar. 14, 2003.

(51) Int. Cl.
*H04L 27/06* (2006.01)

(52) U.S. Cl. ...................... 375/344; 375/326

(58) Field of Classification Search ................ 375/344, 375/326
See application file for complete search history.

(56) References Cited

U.S. PATENT DOCUMENTS 7,068,593 B2 * 6/2006 Cho et al. .................... 370/208
2002/0196844 A1 * 12/2002 Rafie et al. .................. 375/232
2003/0053564 A1 * 3/2003 Kim et al. .................... 375/326

* cited by examiner

*Primary Examiner*—Kevin Kim
(74) *Attorney, Agent, or Firm*—Law Offices of Imam

(57) ABSTRACT

A modem receiver for receiving signals having a frequency domain equalizer training module (FTM) being responsive to a frequency channel response for processing the same to generate one or more frequency domain equalizer (FEQ) coefficients, said modem receiver being responsive to an input signal for processing the same to generate said frequency channel response, said input signal being generated from transmission of a transmitted signal, said frequency channel response for including one or more pilot tones, said FEQ coefficients for including one or more pilot tone FEQ coefficients, in accordance with an embodiment of the present invention. The modem receiver further includes an offset weight determination (OWD) module being responsive to said pilot tone FEQ coefficients for processing the same to generate one or more carrier weights, said modem receiver for using said carrier weights to generate a carrier offset, said OWD module for using said pilot tone FEQ coefficients to generate one or more timing weights, said modem receiver for using said timing weights to generate a timing offset, said modem receiver for reducing the effects of faded pilot tones on determination of said timing offset and said carrier offset between said transmitted signal and said input signal.

20 Claims, 6 Drawing Sheets

EFFICIENT METHOD FOR MULTI-PATH RESISTANT CARRIER AND TIMING FREQUENCY OFFSET DETECTION

REFERENCE TO PRIOR APPLICATION

This application claims the benefit of a previously filed U.S. Provisional Patent Application No. 60/455,152 filed on Mar. 14, 2003, and entitled "AN EFFICIENT METHOD FOR MULTI-PATH RESISTANT CARRIER AND TIMING FREQUENCY OFFSET DETECTION."

BACKGROUND OF THE INVENTION

1. Field of the Invention

The present invention relates generally to the field of wireless receivers and particularly to a method and apparatus for detecting carrier frequency and timing offsets to enhance the receiver performance under the effects of multi-path channel.

2. Description of the Prior Art

As computers have gained enormous popularity in recent decades, so have networking the same allowing for access of files by one computer from another. More recently and with the advent of wireless communication, remote and wireless networking of computers is gaining more and more notoriety among personal users, small and large business owners, factory facilities and the like.

With regard to the wireless networking of personal computers including laptops, a particular modem, namely modems adapted to the IEEE 802.11a or 802.11g industry standard, are commonly employed. That is, an antenna is placed inside or nearby the personal computer and an RF chip receives signal or data through the antenna and an analog-to-digital converter, typically located within the personal computer (PC), converts the received signal to baseband range. Thereafter, a baseband processor is employed to process and decode the received signal to the point of extracting raw data, which may be files transferred remotely and wireless, from another PC or similar equipment with the use of a transmitter within the transmitting PC.

There are several prior art apparatus and techniques for implementing 802.11a/g modem receivers, however, such prior art have not successfully utilized the fullest potential of the 802.11a/g modem. For example, the maximum rate of this type of modem device is 54 Mbits/sec. but in the presence of multi-path channel, use of current prior art methods and apparatus does not allow for reception of data at such rates. In fact, successful reception of data under multi-path channel conditions currently takes place at lower rates or may fail altogether.

Furthermore, in areas other than open locations, such as smaller office cubicles located within the inter structure of a building, prior art receivers are known to only operate at rates lower than that of the maximum operational rate of the modem, such as 54 Mbits/sec., thus preventing a user from receiving files from another PC at optimal rates. This is generally due to the prior art techniques' limitations in operating within multi-path channel conditions, which occur mostly in closed areas, such as those mentioned hereinabove. In particular, multi-path channel may degrade a receiver's ability to acquire and track carrier frequency and timing rate offsets. For 802.11a/g modems that modulate data using orthogonal frequency division multiplexing (OFDM), multi-path channel may lead to dramatic loss in data detection performance because such frequency offsets may result in constellation distortion (e.g. unwanted rotations) and destroy orthogonality between the carriers causing inter-carrier interference (ICI). Thus, for high performance 802.11a/g modems require precise carrier and timing offset controls.

In light of the foregoing, it is desirable to develop an OFDM modem that can receive signals, such as those specified by the 802.11a/g standards, accurately in the presence of multi-path channel and with the ability to achieve maximum data rate throughputs. The presence of multi-path channel should be mitigated in such a way as to reduce the effect of noise, constellation distortions and ICI caused by poor carrier and timing offset controls. Furthermore, it is essential that enhancing the performance of the OFDM receiver be accomplished without adding considerable complexity to the hardware resources employed in processing the received OFDM signal.

SUMMARY OF THE INVENTION

Briefly, an embodiment of the present invention includes a modem receiver for receiving signals having a frequency domain equalizer training module (FTM) being responsive to a frequency channel response for processing the same to generate one or more frequency domain equalizer (FEQ) coefficients, said modem receiver being responsive to an input signal for processing the same to generate said frequency channel response, said input signal being generated from transmission of a transmitted signal, said frequency channel response for including one or more pilot tones, said FEQ coefficients for including one or more pilot tone FEQ coefficients. The modem receiver further includes an offset weight determination (OWD) module being responsive to said pilot tone FEQ coefficients for processing the same to generate one or more carrier weights, said modem receiver for using said carrier weights to generate a carrier offset, said OWD module for using said pilot tone FEQ coefficients to generate one or more timing weights, said modem receiver for using said timing weights to generate a timing offset, said modem receiver for reducing the effects of faded pilot tones on determination of said timing offset and said carrier offset between said transmitted signal and said input signal.

The foregoing and other objects, features and advantages of the present invention will be apparent from the following detailed description of the preferred embodiments which make reference to several figures of the drawing.

IN THE DRAWINGS

DETAILED DESCRIPTION OF THE PREFERRED EMBODIMENTS

Figure 1:
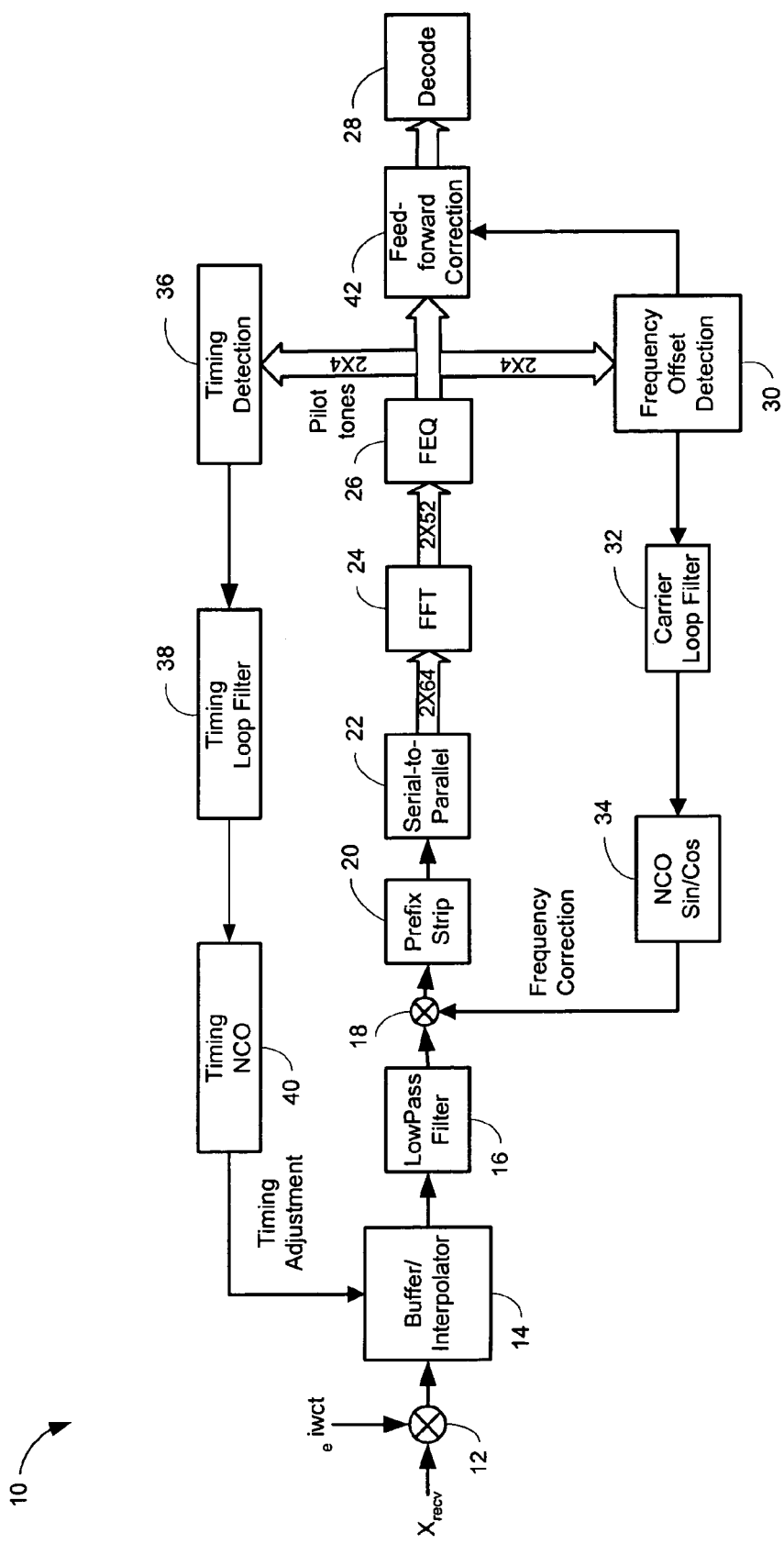
FIG. 1 shows a block diagram 10 of the architecture of an IEEE 802.11g or 802.11a orthogonal frequency division multiplexing (OFDM) modem receiver, in accordance with an embodiment of the present invention.

Referring now to FIG. 1, a block diagram 10 of the architecture of an IEEE 802.11a or 802.11g (802.11a/g) orthogonal frequency division multiplexing (OFDM) modem receiver is shown, in accordance with an embodiment of the present invention. The block diagram 10 includes a first frequency shifter 12, a buffer/interpolator 14, a low pass filter 16, a second frequency shifter 18, a serial to parallel (S/P) converter 22, a fast Fourier transform (FFT) analyzer 24, a frequency domain equalizer (FEQ) 26, a decoding module 28, a frequency offset detection module 30, a frequency loop filter or a carrier loop filter 32, a timing loop filter 38, a timing numerically controlled oscillator (NCO) 40, a carrier NCO 34, a timing offset detection module 36 and a feedforward correction module 42.

Input signals comprising information packets are received by the frequency shifter 12, which is coupled to the buffer/interpolator 14. The buffer/interpolator 14 is coupled to the low pass filter 16 that is coupled to the frequency shifter 18. The latter is coupled to the prefix strip 20. The prefix strip 20 is coupled to the FFT analyzer 24, which is coupled to the FEQ 26. The FEQ 26 is coupled to the feedforward correction module 42, the timing offset detection module 36, and the frequency offset detection module 30. The frequency offset detection module 30 is coupled to the frequency loop filter 32, which is coupled to the NCO 34. The latter is coupled to the frequency shifter 18. The timing offset detection module 36 is coupled to the timing loop filter 38, which is coupled to the NCO 40. The NCO 40 is coupled to the buffer interpolator 14. The feedforward correction module 42 is coupled to the decoding module 28.

Input signals in the intermediate frequency (IF) range, such as 10 Mega Hertz (MHz), are received by the frequency shifter 12. The transmitted signal is initially received in an analog format by an antenna through a radio frequency (RF) receiver (not shown in FIG. 1). The received signal is converted by an analog-to-digital converter (ADC) into digital format to generate the input signals. In an alternative embodiment of the present invention the RF receiver produces a base band signal directly (Zero-IF) thereby eliminating the need for the frequency shifter 12.

However, communication channel conditions are often such that multiple copies of the transmitted signal are received by the RF receiver because of multiple reflections of the transmitted signal from objects and surfaces (e.g. walls, ceiling, trees) in the receiver environment. Such a mode of reception is referred to as a multi-path channel. Multi-path channel may impede detection and compensation of the timing offset and carrier frequency or carrier offset between the transmitted signal and the input signal. The present invention alleviates such negative multi-path effects by correcting carrier frequency and sampling rate offsets through the frequency offset detection module 30 and the timing offset detection module 36, as described in more detail hereinbelow.

In one particular baseband RF implementation, the input signal at the intermediate frequency (IF) is converted by the frequency shifter 12 to a baseband (frequency) signal, which is transferred through the buffer/interpolator 14 where the timing offset is corrected to generate a buffer/interpolator output. The buffer/interpolator output is transferred through a lowpass filter, in order to remove unused spectrum, to the frequency shifter 18. The frequency shifter 18 applies the correction for the carrier frequency offset or carrier offset to the filtered baseband signal based on the frequency feedback information in the form of frequency correction signal received from the NCO 34 to generate the adjusted signal. The adjusted signal is transferred to the prefix strip 20, where the guard interval between symbols is removed. The output of the prefix strip 20 is transferred to the serial-to-parallel converter S/P 22 where a vector signal of 64 sample values is generated. The vector signal of 64 samples is then transferred to the FFT module 24.

In one embodiment of the present invention, the FFT module 24 performs a 64-point FFT converting the 64 time domain samples into 64 frequency domain subcarriers, which comprise one data symbol. As specified by the 802.11a/g standard, each symbol has 64 subcarriers, of which 12 are reserved for guard band separation and 52 are dedicated to the transmitted signal. Of these 52 subcarriers dedicated to the transmitted signal, 4 are allocated as pilot tones for timing and frequency correction while the remaining 48 subcarriers carry the contents of the information packet (i.e., data subcarriers).

To correct the effects of multi-path channel the FEQ 26 applies complex scaling factors, or gains and phases, to compensate for the channel response for each data symbol. The FEQ 26 is trained once during the preamble portion of the information packet, by an FEQ Training Module (FTM) (discussed in detail in relation to FIG. 6) and as discussed in detail in a Provisional Patent Application with Ser. No. 60/455,157, entitled "EFFICIENT SUBCARRIER WEIGHTING TO ENHANCE RECEIVER PERFORMANCE", filed on Mar. 14, 2003, the inventors of which are Alain Chiodini and Thomas Pare, and the disclosure of which is herein incorporated by reference in its entirety. The FEQ 26 is trained to correct for the instantaneous channel conditions on each subcarrier for the remainder of the information packet. Specifically, if a particular subcarrier is deeply faded, the FEQ 26 applies a large gain thereto to amplify the response of the subcarrier.

Large FEQ gain, however, also amplifies the noise component associated with the subcarrier and, if the particular subcarrier is a pilot tone, the large FEQ may adversely affect the performance and stability of the carrier frequency and timing frequency offset loops. To avoid adverse multi-path channel, the frequency offset detection module 30 and the timing offset detection module 36 apply appropriate weights to the pilot tones. The weights are computed during the preamble portion using the FEQ coefficients corresponding to the pilot tones, or the pilot tone FEQ coefficients, by the Offset Weight Determination (OWD) module, as discussed hereinbelow. The carrier weights: $W_1$, $W_2$, $W_3$ and $W_4$ are transferred to the frequency offset detection module 30, while the timing weights, $M_1$ and $M_2$, are sent to the timing offset detection module 36. The weights are used throughout the duration of the packet to ensure proper functioning of the carrier and timing offset loops by mitigating the high pilot noise that can result from the presence of a multi-path channel, as discussed above.

The timing and carrier offset loops are updated on a per symbol basis, using the four pilot tones from the FEQ module 26 to update the frequency offset detection module 30 and the timing offset detection module 36, as depicted in FIG. 1. The output from the frequency offset detection module 30 updates the loop filter 32, which causes the NCO 34 to produce proper frequency correction that is applied at the multiplier shifter 18, on a sample-by-sample basis. In another embodiment of the present invention, NCO 34 generates proper frequency correction that is applied at the multiplier shifter 18 on a symbol-by-symbol basis. Similarly, the timing detection module 36 output updates the timing loop filter 38 which generates a timing loop filter output used in the timing NCO 40 to control the rate of interpolation at the buffer/interpolator 14 by generating a timing adjustment signal. The buffer/interpolator 14 resamples the baseband signal to adjust the timing offset using the timing adjustment signal. In total, the blocks mentioned hereinabove together with the common blocks 16, 20, 22, 24 and 42 comprise the frequency offset and timing offset control loops.

Figure 2:
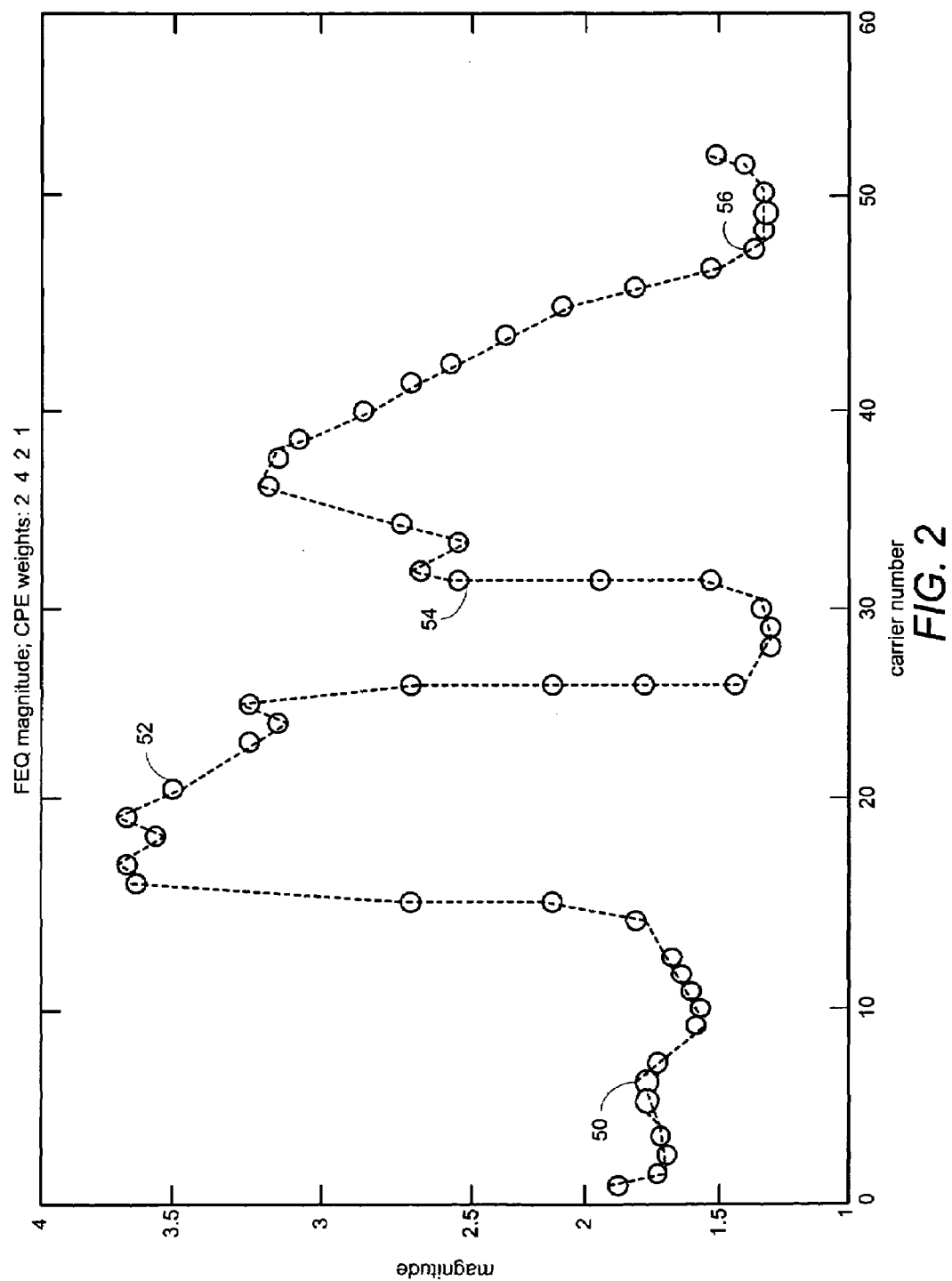
FIG. 2 shows a profile of frequency domain equalizer (FEQ) magnitudes for a channel with mild fading, in accordance with an embodiment of the present invention.
Figure 3:
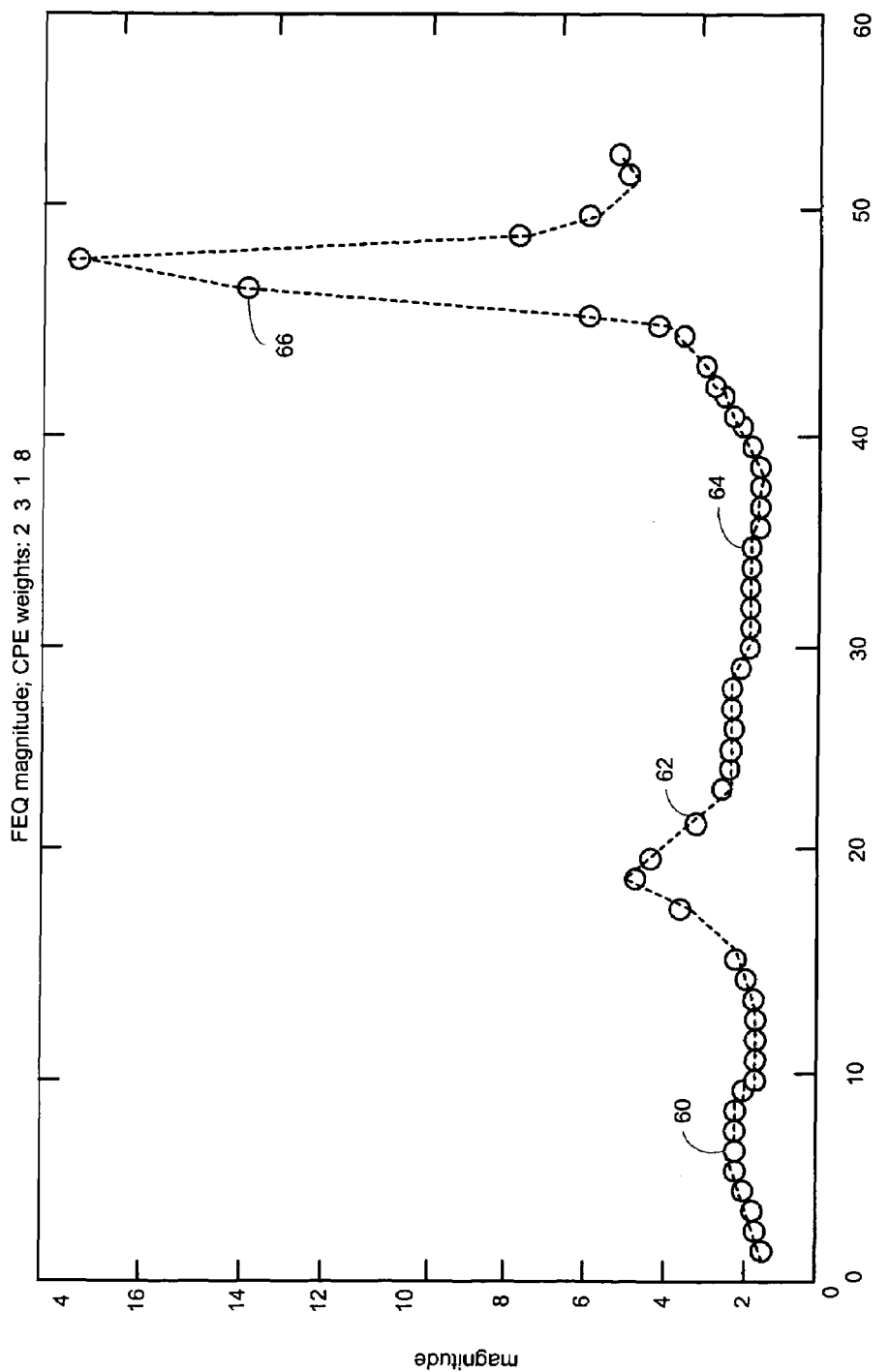
FIG. 3 shows a profile of FEQ magnitudes for a channel with severe fading, in accordance with an embodiment of the present invention.

According to the 802.11a/g standard, among the 52 subcarriers 4 are the pilot tones 50-56, as shown in FIG. 2. The pilot tones are essentially equally spaced among the subcarriers, and using the numbering scheme shown in FIG. 2, correspond approximately to the 7, 21, 35, and 49th subcarriers. For each symbol as processed by the FEQ 26, the four pilot tones are extracted and used to compute the carrier offset. Each pilot tone is demodulated by the FFT 24, FEQ 26 processing as a BPSK (binary phase shift keying) symbol, and may be expressed as a complex number, $p_i$, i=1, 2, 3, 4, corresponding to the locations 7, 21, 35 and 49, respectively, as shown in FIGS. 2 and 3.

The effect of carrier offset on the pilots is to introduce a phase, or rotation, on each of the pilot symbols equally. The offset detector needs to accurately measure this rotation so that it can serve as a feedback signal for the frequency offset control loop. For example, if the four pilot tones in a noise free case were perfect BPSK symbols: $p_i=1+0j$, for i=1, 2, 3, 4, then the same pilot tones experiencing rotation caused by the carrier offset would be $p_i=e^{j\phi}$, for i=1, 2, 3, 4, where $\phi$ is the angle of rotation or phase. Note that the carrier offset affects each carrier with the same phase $\phi$, hence being referred to as common phase error (CPE). In a prior art implementation a carrier offset detector measures CPE in an 802.11a/g modem by simply summing the pilot tones and computing the angle of the result as $$CPE = \text{angle}(\Sigma p_i) = a\tan(\text{imag}(\Sigma p_i)/\text{real}(\Sigma p_i)). \quad (1)$$

In equation (1), the angle is computed using an arctangent function, atan( ), and real( ) and imag( ) functions representing real and imaginary parts of the argument in parentheses, respectively. The CPE angle is the feedback signal for the carrier offset loop, and is sent as the input signal to the loop filter 32 shown in FIG. 1. The problem with the prior art implementations arises when one or more of the pilot tones becomes corrupted due to multipath channel fading.

Referring now to FIG. 2, a profile of FEQ magnitudes is shown that is consistent with a channel experiencing mild fading due to multipath channel. Shown in FIG. 2 are the 52 subcarriers, numbered along the horizontal axis whose FEQ magnitudes are indicated with small circles on the vertical axis measured in decibels (dB). As shown in FIG. 2, the relative difference between the highest FEQ magnitude and the lowest FEQ magnitude is approximately 3 dB, indicating that the channel response is not faded severely enough to require application of a large gain. Hence, the profile of the FEQ magnitudes shown in FIG. 2 that would be computed during the packet preamble is that of a channel with mild fading. In particular, the FEQ magnitudes 50-56 are all within approximately 2 dB gain of each other, and thus the corresponding pilot tones provide a reasonably good measure of the CPE.

On the other hand, referring now to FIG. 3, a profile of FEQ magnitudes for a channel with a severe fading is shown that might be representative of a channel condition present in a typical office environment (cubical walls, ceilings, etc.).

Note that the FEQ values corresponding to the pilot tones or the pilot tone FEQ coefficients 60-66 do not have values close in magnitude as for the previous condition depicted in FIG. 2. In particular, the pilot tone 66, located at the 49$^{th}$ subcarrier, is severely faded, as indicated by the high gain of more than 14 dB, compared to the other pilot tones 60-64 which only require FEQ gains of approximately 2 dB. Thus, the pilot tone 66 is considered severely faded, and as such provides a poor quality estimate of the CPE. Indeed, the large FEQ gain on the pilot tone 66 will lead to a high noise component in the calculation of the CPE as described by equation (1) above. This may have an adverse effect on the operation of the frequency offset control loop and simulations indicate that for various hardware implementations the particular channel condition shown in FIG. 3 will cause frequency offset control loop instability and loss of the received packet. In contrast, mild fading of the channel shown in FIG. 2 may have no noticeable effect on the stability of the frequency offset loop. The present invention overcomes such sensitivity to channel conditions by augmenting determination of the CPE with a set of weights based on the channel fade condition.

Specifically, a set of weights W is determined by the offset weight determination module OWD during the preamble portion of the information packet using the magnitude portion of the FEQ coefficients corresponding to the pilot tones. The carrier weights, $W_1$-$W_4$ are proportional to the inverse of the squared FEQ magnitudes, and are evaluated as $$W_i = \text{round}(-\log(|FEQ_i|^2)). \quad (2)$$

In equation (2), $|FEQ_i|^2$ is the magnitude squared of the i$^{th}$ pilot tone FEQ coefficient, where i=1 through 4. The round function in equation (2) rounds off the log value in parentheses to the nearest integer rendering $W_i$ an integer value. Log in equation (2) represents the logarithmic function to base 2. For example, using equation (2) the set of carrier weights W for the pilot tones 50-56 is determined to be W=[2, 4, 2, 1]. Similarly, equation (2) using the FEQ coefficients shown in FIG. 3 yields the set of weights W=[2, 3, 1, 8]. It is evident from the second set of weights that a relatively large weight $W_4$=8, is assigned to the 4$^{th}$ pilot tone 66. The carrier offset weights are used to augment the basic CPE equation (1) to form a modified $CPE^W$ as:

$$CPE^W = \text{angle}(\Sigma shr(p_i, W_i)) = a\tan(\text{imag}(\Sigma shr(p_i, W_i)/\text{real}(\Sigma shr(p_i, W_i))). \quad (3)$$

In equation (3) $shr(p_i, W_i)$ is a binary shift right function which shifts the integer value of $p_i$ to the right by $W_i$ places. Consequently, using (3), the pilot tone 66 (i.e. $p_4$) is shifted right 8 places, i.e., it is divided by $2^8$=256, which effectively nullifies the effect of the pilot tone 66 on the $CPE^W$ calculation. The result of such division is a set of weighted pilot tones. Accordingly, any large noise component associated with the pilot 66 has minimal impact on the operation of the frequency offset control loop. For the channel condition depicted in FIG. 2, the set W=[2, 4, 2, 1] indicates less severe channel condition with the deepest pilot tone fading resulting in a weight of $W_2$=4, corresponding to the pilot tone 52. The corresponding pilot tone $p_2$ will be divided by $2^4$=16 to generate a weighted pilot tone, thereby allowing more information to be used than in the case of the severely faded pilot tone 66 in FIG. 3. In the case of clear, or flat channels, the set of weights is simply all unity, W=[1, 1, 1, 1], meaning that all the pilot tones will be weighted equally which will provide the best noise attenuation and give the best estimate of the common phase error $CPE^W$, given by (3).

Figure 4:
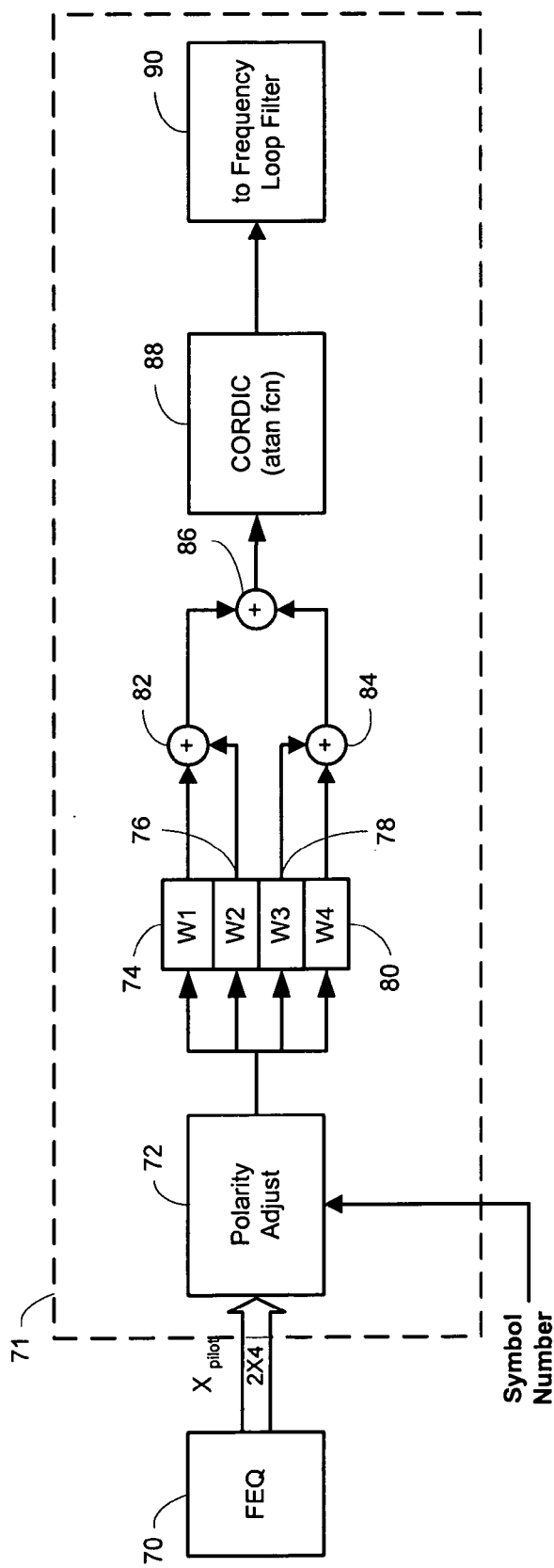
FIG. 4 shows a block diagram outlining the interaction between an FEQ and a frequency offset detection module, in accordance with an embodiment of the present invention.

Referring now to FIG. 4, a block diagram depicting the hardware implementation of the $CPE^W$ computation detailed in equation (3) is shown, in accordance with an embodiment of the present invention. FIG. 4 depicts an FEQ module 70 coupled to a carrier offset detection or $CPE^W$ module 71. The FEQ module 70 is used to gain and phase adjust the pilot symbols, which are then passed to the $CPE^W$ module 71. The process depicted in FIG. 4 occurs once for each data symbol in the information packet. In the $CPE^W$ module 71 there is a simple polarity adjustment 72 performed according to the IEEE standard 802.11a-1999, page 23, to generate phase-corrected pilot tones. The phase-corrected pilot tones are scaled by the bank of carrier weights $W_1$-$W_4$ (74-80), that are derived according to equation (2) during the preamble portion of the information packet by the OWD module to generate weighted pilot tones, as discussed hereinbelow. The weighted pilot tones are then summed together by the adders 82-86, and the result is input to the Coordinate Rotation Digital Computer CORDIC module 88, which includes an efficient hardware implementation of the atan( ) function. Note that the operation performed by the blocks included in the $CPE^W$ module 71 in FIG. 4 is a direct implementation of $CPE^W$ equation (3), as discussed above. The angle output of the CORDIC module 88 is then passed to the frequency loop filter 90. The frequency loop filter output, generated by filter 90, is processed by the NCO 34 to generate a real-time frequency correction signal that is applied to the baseband signal, as shown at the frequency shifter 18 in FIG. 1.

To summarize, the $CPE^W$ module 71 shown in FIG. 4 is a module that computes an estimate of the instantaneous carrier offset represented by the $CPE^W$ during the steady state operation of the carrier control loop, shown in FIG. 1. That is, the carrier offset is determined by computing the $CPE^W$. The $CPE^W$ module 71 automatically prevents the effects of multi-path channel fading from corrupting the CPE calculation by applying a set of carrier weights to the pilot symbols that are included with each data symbol in the packet. The weights are computed once at the beginning of the packet during the preamble, and immediately after the computation of the FEQ. The FEQ coefficients corresponding to the pilot tones provide the channel fade information necessary to compute the set of weights, as specified by equation (2). The weights W1-W4 computed during the preamble are then transferred to the $CPE^W$ module 71 to be used for steady state operation during the data portion of the information packet.

An important aspect of the $CPE^W$ module 71 module is that the effective gain of the module remains relatively the same under varying channel conditions. That is to say, given a fixed CPE value (in degrees), and two very different channel conditions, as say depicted in FIGS. 2 and 3, even though the set of weights employed by the module may vary the CPE angle computed will be the same in a noise free channel. Relative constancy of the effective gain is critical in order for closed loop stability to be maintained under varying channel conditions. If the effective gain were to vary freely as the weights $W_1$-$W_4$ changed, then the loop gain would vary. Variation of the loop gain could cause loss in either gain and/or phase margins and possibly cause the loop to become unstable, leading to packet reception failure. An important feature of the $CPE^W$ module 71 is that the weightings are applied to the complex pilot symbols before the CORDIC module 88. The CORDIC module 88 naturally converts the weighted sum back into dimensionless angular coordinates, thus maintaining the gain of the $CPE^W$ module 71. In this sense, the $CPE^W$ module 71 mitigates the noise effects of the fading channel while maintaining loop stability conditions that are robust to varying channel conditions.

In addition to the feedback control, the $CPE^W$ also provides the signal to the feedforward correction module 42. In the feedforward correction module 42 the $CPE^W$ corrects a well-known error caused by the imperfections in the analog radio frequency (RF) circuit, as discussed in detail in Garcia Armada, Ana and Calvo, Miguel, "Phase Noise and Sub-Carrier Spacing Effects on the Performance of an OFDM Communication System", IEEE Communications Letters, Vol. 2, No. 1, January 1998.

Noise in the voltage controlled oscillator (VCO) circuits is known to cause spurious rotations in the equalized data symbol, X, generated by the FEQ module 26. The FEQ OFDM equalized data symbol is comprised of 48 subcarriers:

$$X=[x_1, x_2, \ldots, x_{48}]$$

Each subcarrier is a complex symbol, either BPSK, quadrature phase shift keying (QPSK), 16 quadrature amplitude modulation (QAM), or 64QAM. These subcarrier equalized data symbols are corrected by forming the phase correction $P_{correction}$ based on the $CPE^W$ as:

$$P_{correction}=e^{-jCPEW}.$$

The feedforward correction module 42 computes $P_{correction}$ and applies the correction to the OFDM equalized data symbol by multiplying each subcarrier with $P_{correction}$ to generate a corrected equalized data symbol $X_{corrected}$ as:

$$X\text{corrected}=P_{correction}*X=[e^{-jCPEW}*x_1, e^{-jCPEW}*x_2, \ldots, e^{-jCPEW}*x_{48}].$$

Computing the feedforward correction as indicated hereinabove with $CPE^W$, rather than using CPW, provides protection for the equalized data symbol against excess RF carrier impairment due to multi-path fading, in a beneficial way analogous to the feedback implementation discussed hereinabove for the carrier loop filter.

Figure 5:
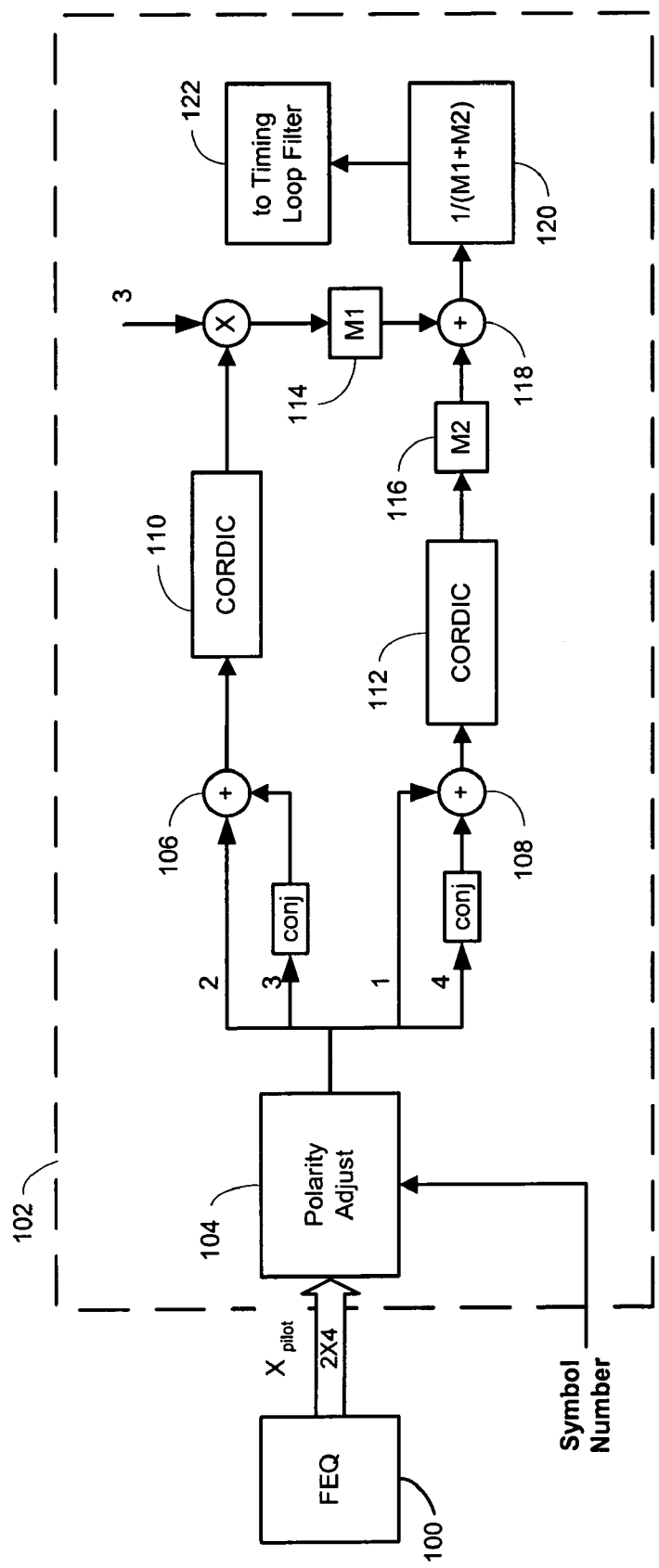
FIG. 5 illustrates a block diagram outlining the interaction between an FEQ and a timing offset detection module, in accordance with an embodiment of the present invention.

Referring now to FIG. 5, a block diagram outlining the interaction between an FEQ module 100 and a timing offset detection module 102 is shown, in accordance with an embodiment of the present invention. The FEQ module 100 is coupled to the timing offset detection module 102 by the same interface as that depicted in FIG. 4, which depicts the carrier or frequency offset detection module 71. The timing offset detection module 102 includes the polarity adjustment module 104 coupled to 2 summation junctions 106 and 108, which are coupled to 2 CORDIC modules 110 and 112, respectively. The CORDIC modules 110 and 112 are coupled to 2 weighting modules 114 and 116, respectively, and the latter are coupled to a normalization module 120. The normalization module 120 is coupled to the timing loop filter 122.

The FEQ module 100, during the packet decoding process, transfers the pilot tones $p_i$, where i ranges from 1 through 4, to the polarity adjust module 104, as discussed aboveinabove and as specified in the IEEE Standard 802.11a-1999, page 23. To determine the timing offset, $p_2$ and the conjugate of $p_3$ are added at the summation junction 106, and $p_1$ and the conjugate of $p_4$ are added at the summation junction 108 to generate first and second intermediate vectors, respectively. The angular part 01 of the first intermediate vector is computed at the CORDIC module 110 and the angular part $\theta_2$ of the second intermediate vector is computed at the CORDIC module 112. The intermediate angles, $\theta_1$ and $\theta_2$, are then scaled by the timing weights $M_1$ and $M_2$, respectively at the weighting modules 114 and 116 to generate 2 weighted angles. The weighted angles are then added at the summation junction 118 and then normalized by the ratio $1/(M_1+M_2)$ at the normalizing module 120 to generate a normalized angle. The normalized angle, which is the timing offset is then transferred to the timing loop filter 122 in order to complete the timing loop control operation, discussed hereinabove and shown in more complete detail in FIG. 1. Note that although the CORDIC modules 110 and 112 are listed separately, they may physically represent a single time-shared hardware module.

The timing offset detection module 102 in FIG. 5 is operational during the data portion of the information packet, as specified in IEEE 802.11a-1999, and computes one timing offset value per each data symbol in the packet. As was the case for the carrier offset detection discussed above, the timing weights $M_1$ and $M_2$ are calculated, at the modules 114 and 116 respectively, once during the preamble portion of the packet by the OWD module, immediately following the FEQ calculation and are based on the pilot tone FEQ coefficients, as discussed hereinbelow. The values $M_1$ and $M_2$ are then loaded into timing offset detection module 102 and remain fixed for the subsequent decoding of the data portion of the packet.

Timing offset creates a phase effect across the OFDM pilot tones that varies linearly with frequency, or since the pilot tones are evenly spaced, the timing offset phase varies linearly with pilot number. Accordingly, we can refer to the timing offset detection module 102 as the linear phase error ($LPE^M$) module in a manner consistent with the $CPE^W$ module 71, wherein the superscript refers to the weights $M_1$ and $M_2$. For example, if the timing offset parameter to be measured is $\tau$, then the resulting phase effect on the four pilot tones would be $p_1=e^{3\tau j}$, $p_2=e^{\tau j}$, $p_3=e^{-\tau j}$ and $p_4=e^{-3\tau j}$, respectively. Given this particular timing offset, the output of the CORDIC module 110 would be $$\theta_1 = \text{Angle}(p_2 + \text{conj}(p_3)) = \text{angle}(2e^{\tau j}) = \tau. \quad (3)$$

Similarly, the output of the CORDIC module 112 would be $$\theta_2 = \text{Angle}(p_1 + \text{conj}(p_4)) = \text{angle}(2e^{3\tau j}) = 3\tau. \quad (4)$$

Note that the intermediate angle $\theta_1$ is scaled by 3 prior to the weight module 114 and summation junction 118 to take into account the natural scaling between the pilot tone offset angles $\theta_1$ and $\theta_2$, as indicated by equations (3) and (4). A typical prior art receiver then might implement the LPE computation as:

$$LPE = (\theta_1 + \theta_2)/4.$$

In one embodiment of the present invention, in order to compute the weights $M_1$ and $M_2$, two intermediate weights, $WI_1$ and $WI_2$, are generated as $$WI_1 = \text{round}(-\log(|FEQ_2|^2) - \log(|FEQ_3|^2)),$$

$$WI_2 = \text{round}(-\log(|FEQ_1|^2) - \log(|FEQ_4|^2)), \quad (5)$$

within the OWD module. In equation (5), $|FEQ_i|^2$ is the magnitude squared of the $i^{th}$ pilot tone FEQ coefficient, where i=1 through 4. Then the timing weights that would be used in the timing offset detection module 102 are $$M_1 = \text{round}(512 * WI_2/(WI_1 + WI_2)),$$

and $$M_2 = 512 - M_1. \quad (6)$$

So that the LPE (linear phase error) becomes:

$$LPE^M = (M_1\theta_1 + M_2\theta_2)/512. \quad (7)$$

Equation (7) provides a weighting scheme between the two angles based on the relative signal quality that exists between the two pairs of pilot tones $(p_2, p_3)$ and $(p_1, p_4)$, as indicated by the cumulative channel fade conditions on the pilot subcarriers that is contained in the corresponding FEQ coefficient magnitudes. The FEQ information is used explicitly to compute the intermediate weights in equation (5). Equation (6) is used to produce a pair of timing weights $M_1$ and $M_2$ that optimally combine the angle measurements in a least squares error sense while maintaining the overall gain of the timing offset module to be constant. Note that the added gain of $M_1+M_2=512$ is removed from the detector by the normalizing module 120 by implementing equation (7) before the timing offset, i.e. $LPE_M$, is sent to the timing loop filter 122. Note, however, that the number 512 was chosen to provide a reasonable amount of resolution between the two weights. A smaller binary number, say 128 or 256, could also have been chosen to implement and achieve similar performance. However the choice of a binary number is desirable since it leads to hardware simplification by avoiding relatively expensive multiplier operation due to the weights being implemented with shift operators.

To summarize, the timing offset detection module or the $LPE^M$ module 102 computes an estimate of the instantaneous timing offset represented by $LPE^M$ during the steady state operation of the timing control loop, shown in FIG. 1. That is, the timing offset is determined by computing the $LPE^M$. The $LPE^M$ module 102 automatically prevents the effects of multi-path channel fading from corrupting the $LPE^M$ calculation by applying a set of weights to a pair of intermediate angles $\theta_1$ and $\theta_2$ that are computed using the pilot tones that are included with each data symbol in the information packet. The weights are computed once at the beginning of the packet during the preamble by the OWD, and immediately after the computation of the FEQ. The pilot tone FEQ coefficients provide the channel fade information necessary to compute the set of weights, as specified by equations (5-6). The weights $M_1$, $M_2$, computed during the preamble, are transferred to the $LPE^M$ module 102 to be used for steady state operation during the data portion of the information packet to provide active feedback control for the timing control loop. As was true in the design of the $CPE^W$ module 71, the $LPE^M$ module 102 maintains constant gain as the timing weights are allowed to adapt to changing channel conditions. The $LPE^M$ module 102 effectively mitigates the noise effects of the fading channel while maintaining the loop stability margins (gain and phase) that are necessary for reliable, robust performance in varying channel conditions.

It is noted that a conventional implementation of an OFDM modem receiver would not use the weighting schemes included in the $LPE^M$ and $CPE^W$ modules 102 and 71, respectively. For example, if the carrier and timing weights ($W_1$-$W_4$, $M_1$-$M_2$) were set to unity the carrier and timing offsets would rely solely on the averaging effects of all the pilot symbol additions. Alternatively, a conventional implementation of a least squares (LS) algorithm might be used to compute the timing and carrier offsets jointly. However, by including the weights that are based on the FEQ magnitudes, the present invention uses a measure of the noise and channel-fading present in each of the pilot tones to improve the measurement of the offsets. Moreover, the weights computed using equations (2) and (5-6) in common channel-fading conditions are proportional to the variances of the noise associated with the pilot tones ($p_1$, $p_2$, $p_3$, $p_4$) for the carrier offset, and the intermediate angles ($\theta_1$, $\theta_2$) in the timing offset. Hence, use of the aforementioned weights allows for a more optimal approximation to a weighted least squares (WLS) estimate of the carrier and timing offsets.

Figure 6:
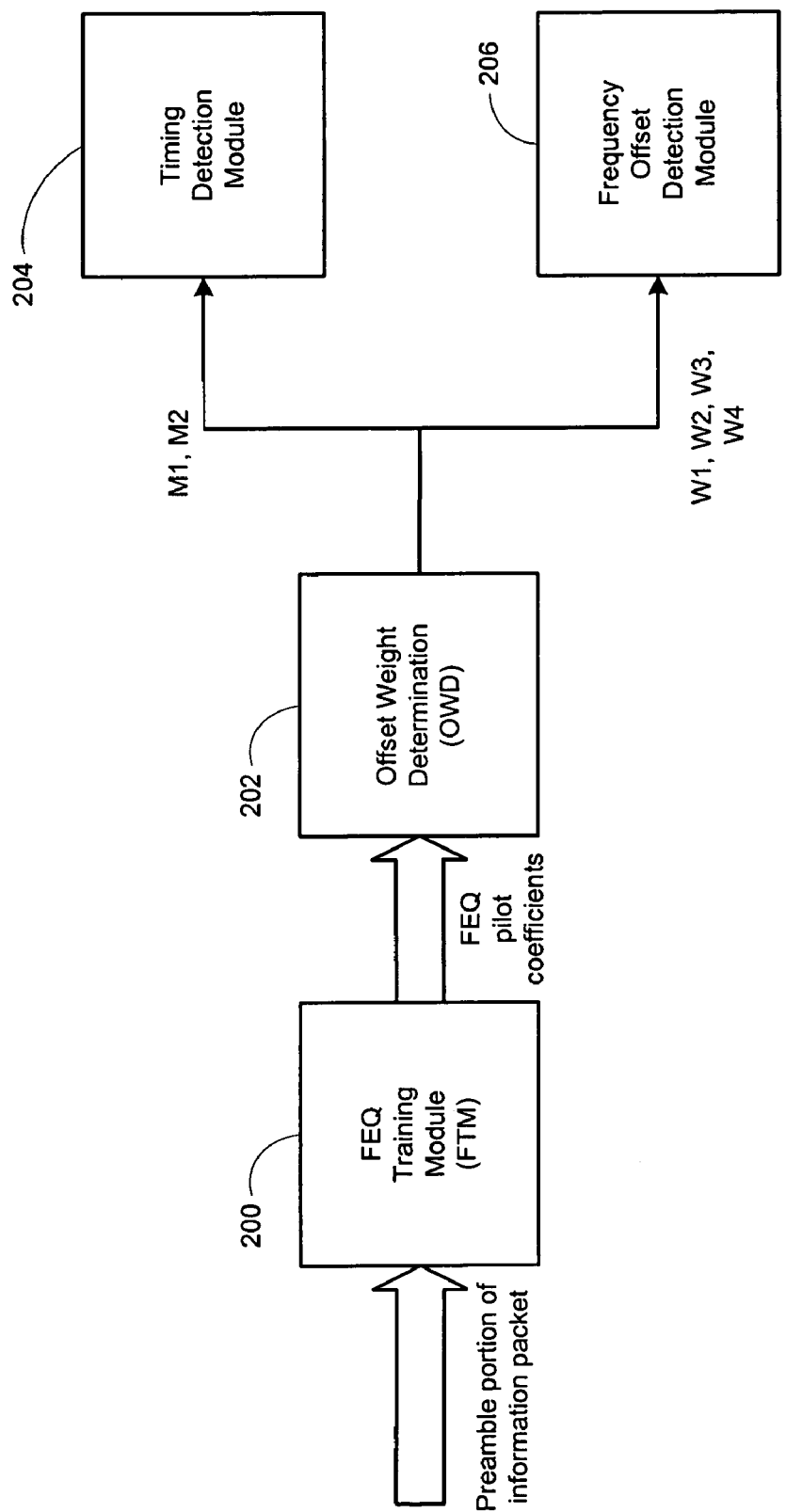
FIG. 6 illustrates a block diagram outlining computation of the timing and carrier weights, in accordance with an embodiment of the present invention.

Referring now to FIG. 6, a block diagram outlining computation of the timing weights $M_1$-$M_2$ and carrier weights $W_1$-$W_4$ is shown, in accordance with an embodiment of the present invention. Shown in FIG. 6 is a frequency domain equalizer training module (FTM) 200 coupled to offset weight determination (OWD) module 202, which is coupled to timing offset detection module 204 and frequency or carrier offset detection module 206.

In the embodiment of the present invention shown in FIG. 1, the FTM 200 and OWD module 202 are located within the FEQ 26. However, in another embodiment of the present invention, the FTM and OWD module are located externally to the FEQ 26 but included within the modem receiver.

The preamble portion of the information packet received by the FTM 200 is used to train the FEQ, as discussed in the Provisional Patent Application referred to hereinabove. The FTM 200 generates pilot tone FEQ coefficients, which are transferred to the OWD module 202. The OWD module 202, using the pilot tone FEQ coefficients, computes the carrier weights $W_1$-$W_4$ using equation (2) and the timing weights $M_1$ and $M_2$ using equation (6). The carrier and timing weights are computed using the preamble portion of the information packet. The carrier weights $W_1$-$W_4$ are transferred to the frequency offset detection module 206, while the timing weights $M_1$ and $M_2$ are transferred to the timing offset detection module 204. The carrier and timing weights are subsequently used for steady state operation during the data portion of the information packet to mitigate the effects of multipath channel, as discussed hereinabove.

The modem receiver (shown in FIG. 1) includes a processor (not shown), or computer medium, some type of storage area and a computer readable medium, for storing the software/firmware described in FIGS. 4, 5, and 6. The processor executes codes from the computer readable medium for effectuating the functions outlined in FIGS. 4, 5, and 6.

The present invention described hereinabove provides an efficient means and apparatus for mitigating the effects of fading-channel conditions and allows the modem to reliably compensate for carrier frequency and timing offsets. In addition, the present invention allows maximum performance of the 802.11a/g receiver to be utilized and optimizes performance by mitigating the effects of multipath channel and/or inter-carrier interference (ICI). Accordingly, the present invention allows robust and high performance reception of transmitted signals with minimal hardware cost.

Although the present invention has been described in terms of specific embodiment, it is anticipated that alterations and modifications thereof will no doubt become apparent to those more skilled in the art. It is therefore intended that the following claims be interpreted as covering all such alterations and modification as fall within the true spirit and scope of the invention.

What is claimed is:

1. A modem receiver for receiving signals comprising:
a frequency domain equalizer training module (FTM) being responsive to a frequency channel response for processing the same to generate one or more frequency domain equalizer (FEQ) coefficients, said modem receiver being responsive to an input signal for processing the same to generate said frequency channel response, said input signal being generated from transmission of a transmitted signal, said frequency channel response for including one or more pilot tones, said FEQ coefficients for including one or more pilot tone FEQ coefficients; and an offset weight determination (OWD) module being responsive to said pilot tone FEQ coefficients for processing the same to generate one or more carrier weights, said modem receiver for using said carrier weights to generate a carrier offset, said OWD module for using said pilot tone FEQ coefficients to generate one or more timing weights, said modem receiver for using said timing weights to generate a timing offset, said modem receiver for reducing the effects of faded pilot tones on determination of said timing offset and said carrier offset between said transmitted signal and said input signal.

2. A modem receiver as recited in claim 1 further including a frequency offset detection module and a timing offset detection module, said frequency offset detection module for determining said carrier offset by computing a weighted common phase error ($CPE^W$), said timing offset detection module for determining said timing offset by computing a linear phase error ($LPE^M$).

3. A modem receiver as recited in claim 2 wherein said OWD module for using the logarithmic (log) value of said pilot tone FEQ coefficients to determine said carrier weights, said OWD for rounding off said log value to determine said carrier weights, the $i^{th}$ one of said carrier weights ($W_i$) being determined from the $i^{th}$ one of said pilot tone FEQ coefficients ($FEQ_i$) according to:

$$W_i = \text{round}(-\log(|FEQ_i|^2)).$$

4. A modem receiver as recited in claim 3 wherein said frequency offset detection module being responsive to said carrier weights for processing the same to generate one or more weighted pilot tones, the $i^{th}$ one of said weighted pilot tones ($\text{shr}(p_i, W_i)$) being generated by a binary shift right function by shifting the integer value of the $i^{th}$ one of said pilot tones ($p_i$) to the right by $W_i$ places.

5. A modem receiver as recited in claim 3 wherein the number of said pilot tones is 4.

6. A modem receiver as recited in claim 4 wherein said $CPE^W$ being determined by computing the angle of the sum of said weighted pilot tones using an arctangent (atan) function, the argument of said atan function for including the imaginary (imag) and real parts of said weighted pilot tones according to:

$$CPE^W = \text{angle}(\Sigma \text{shr}(p_i, W_i)) = \text{atan}(\text{imag}(\Sigma \text{shr}(p_i, W_i))/\text{real}(\Sigma \text{shr}(p_i, W_i))).$$

7. A modem receiver as recited in claim 5 wherein said OWD module for generating 2 intermediate weights ($WI_1$, $WI_2$) using said pilot tone FEQ coefficients according to:

$$WI_1 = \text{round}(-\log(|FEQ_2|^2) - \log(|FEQ_3|^2)),$$

$$WI_2 = \text{round}(-\log(|FEQ_1|^2) - \log(|FEQ_4|^2)).$$

8. A modem receiver as recited in claim 7 wherein said OWD module for generating 2 timing weights ($M_1$, $M_2$) using said intermediate weights according to:

$$M_1 = \text{round}(512 * WI_2 / (WI_1 + WI_2)),$$

$$M_2 = 512 - M_1.$$

9. A modem receiver as recited in claim 8 wherein said timing offset detection module being responsive to said pilot tones for processing the same to generate 2 intermediate angles ($\theta_1$, $\theta_2$), said timing offset detection module for weighting said timing weights with said $\theta_1$ and $\theta_2$ to generate said $LPE^M$ according to:

$$LPE^M=(M_1\theta_1+M_2\theta_2)/512.$$

10. A modem receiver as recited in claim 2 wherein said FEQ being responsive to said frequency channel response to process the same to generate equalized data symbols, each of said equalized data symbols for including one or more equalized data subcarriers, said modem receiver further including a feedforward correction module for using said $CPE^W$ to process each of said equalized data symbols to generate a corrected equalized data symbol for enhancing protection against excessive radio frequency (RF) carrier impairment.

11. A modem receiver as recited in claim 2 further including a frequency loop filter responsive to said $CPE^W$ for using the same to generate a frequency loop filter output, said modem receiver further including a carrier numerically controlled oscillator (NCO) being responsive to said frequency loop filter output to generate a frequency correction signal.

12. A modem receiver as recited in claim 11 further including a timing loop filter responsive to said $LPE^M$ for using the same to generate a timing loop filter output, said modem receiver further including a timing NCO being responsive to said timing loop filter output to generate a timing adjustment signal, said modem receiver further including a buffer/interpolator being responsive to said timing adjustment signal for processing the same to generate a buffer/interpolator output by correcting for said timing offset.

13. A modem receiver as recited in claim 12 further including a first frequency shifter being responsive to said input signal for converting the same to a baseband signal.

14. A modem receiver as recited in claim 13 further including a low pass filter being responsive to said buffer/interpolator output for processing the same to generate a filtered baseband signal, said modem receiver further including a second frequency shifter being responsive to said filtered baseband signal and said frequency correction signal for processing the same to generate an adjusted signal by correcting for said carrier offset.

15. A modem receiver as recited in claim 2 wherein said input signal includes a preamble portion and a data portion, said timing weights and said carrier weights being determined during said preamble portion, said $CPE^W$ and said $LPE^M$ being determined during said data potion.

16. A method for receiving signals comprising:
receiving a frequency channel response for processing the same to generate one or more frequency domain equalizer (FEQ) coefficients including pilot tone FEQ coefficients;
receiving an input signal for processing the same to generate the frequency channel response including one or more pilot tones;
processing the pilot tone FEQ coefficients to generate one or more carrier weights;
generating a carrier offset;
using the pilot tone FEQ coefficients to generate one or more timing weights; and
generating a timing offset for reducing the effects of faded pilot tones on determination of the timing and carrier offsets.

17. A modem receiver for receiving signals comprising:
a frequency domain equalizer training module (FTM) being responsive to a frequency channel response for processing the same to generate one or more frequency domain equalizer (FEQ) coefficients, said modem receiver being responsive to an input signal for processing the same to generate said frequency channel response, said input signal being generated from transmission of a transmitted signal, said frequency channel response for including one or more pilot tones, said FEQ coefficients for including one or more pilot tone FEQ coefficients; and an offset weight determination (OWD) module being responsive to said pilot tone FEQ coefficients for processing the same to generate one or more carrier weights, said modem receiver for using said carrier weights to generate a carrier offset, said modem receiver for reducing the effects of faded pilot tones on determination of said carrier offset between said transmitted signal and said input signal.

18. A modem receiver for receiving signals comprising:
a frequency domain equalizer training module (FTM) being responsive to a frequency channel response for processing the same to generate one or more frequency domain equalizer (FEQ) coefficients, said modem receiver being responsive to an input signal for processing the same to generate said frequency channel response, said input signal being generated from transmission of a transmitted signal, said frequency channel response for including one or more pilot tones, said FEQ coefficients for including one or more pilot tone FEQ coefficients; and an offset weight determination (OWD) module being responsive to said pilot tone FEQ coefficients for processing the same to generate one or more timing weights, said modem receiver for using said timing weights to generate a timing offset, said modem receiver for reducing the effects of faded pilot tones on determination of said timing offset between said transmitted signal and said input signal.

19. A modem receiver for receiving signals comprising:
means for receiving a frequency channel response for processing the same to generate one or more frequency domain equalizer (FEQ) coefficients including pilot tone FEQ coefficients;
means for receiving an input signal for processing the same to generate the frequency channel response including one or more pilot tones;
means for processing the pilot tone FEQ coefficients to generate one or more carrier weights;
means for generating a carrier offset;
means for using the pilot tone FEQ coefficients to generate one or more timing weights; and
means for generating a timing offset for reducing the effects of faded pilot tones on determination of the timing and carrier offsets.

20. A computer readable medium having stored therein computer readable program code comprising:
receiving a frequency channel response for processing the same to generate one or more frequency domain equalizer (FEQ) coefficients including pilot tone FEQ coefficients;
receiving an input signal for processing the same to generate the frequency channel response including one or more pilot tones;

processing the pilot tone FEQ coefficients to generate one or more carrier weights;
generating a carrier offset;
using the pilot tone FEQ coefficients to generate one or more timing weights; and
generating a timing offset for reducing the effects of faded pilot tones on determination of the timing and carrier offsets.

* * * * *

UNITED STATES PATENT AND TRADEMARK OFFICE
CERTIFICATE OF CORRECTION

| | | |
|---|---|---|
| PATENT NO. | : 7,245,677 B1 | Page 1 of 1 |
| APPLICATION NO. | : 10/797299 | |
| DATED | : July 17, 2007 | |
| INVENTOR(S) | : Thomas Edward Pare, Jr. | |

It is certified that error appears in the above-identified patent and that said Letters Patent is hereby corrected as shown below:

Col. 6, line 63; should read -- angular part $\theta_1$ --.

Signed and Sealed this

Eleventh Day of September, 2007

JON W. DUDAS
*Director of the United States Patent and Trademark Office*

UNITED STATES PATENT AND TRADEMARK OFFICE
CERTIFICATE OF CORRECTION

PATENT NO.        : 7,245,677 B1                                              Page 1 of 1
APPLICATION NO. : 10/797299
DATED             : July 17, 2007
INVENTOR(S)       : Thomas Edward Pare, Jr.

It is certified that error appears in the above-identified patent and that said Letters Patent is hereby corrected as shown below:

Column 8, line 63; should read -- angular part $\theta_1$ --.

Signed and Sealed this

Twentieth Day of November, 2007

JON W. DUDAS
*Director of the United States Patent and Trademark Office*